United States Patent [19]
Debus et al.

[11] 4,265,674
[45] May 5, 1981

[54] ADDITIVE FOR CONCRETE OR MORTAR AND THE USE THEREOF

[75] Inventors: Gerhard Debus, Rüdesheim; Friedrich Girg, Idstein; Volker Knittel, Wiesbaden, all of Fed. Rep. of Germany

[73] Assignee: Hoechst Aktiengesellschaft, Fed. Rep. of Germany

[21] Appl. No.: 64,515

[22] Filed: Aug. 7, 1979

[30] Foreign Application Priority Data

Aug. 12, 1978 [DE] Fed. Rep. of Germany ....... 2835423

[51] Int. Cl.³ ............................................. C04B 7/353
[52] U.S. Cl. ..................................... 106/314; 106/93
[58] Field of Search ................ 106/93, 314, 115, 119, 106/121, 163 R, 169 R

[56] References Cited

U.S. PATENT DOCUMENTS

| 3,885,985 | 5/1975 | Serafin et al. ........................... 106/90 |
| 4,058,405 | 11/1977 | Snyder et al. .......................... 106/93 |

FOREIGN PATENT DOCUMENTS

| 1122895 | 7/1964 | Fed. Rep. of Germany . |
| 1671279 | 8/1971 | Fed. Rep. of Germany ............. 106/93 |
| 2304478 | 8/1974 | Fed. Rep. of Germany . |
| 2319707 | 11/1974 | Fed. Rep. of Germany . |
| 2450681 | 4/1975 | Fed. Rep. of Germany . |
| 2403444 | 8/1975 | Fed. Rep. of Germany . |
| 2704929 | 5/1978 | Fed. Rep. of Germany . |
| 2751764 | 6/1978 | Fed. Rep. of Germany . |

OTHER PUBLICATIONS

Chem. Abstracts, vol. 83, 1975, p. 230, #62246h.

*Primary Examiner*—James Poer
*Attorney, Agent, or Firm*—James E. Bryan

[57] ABSTRACT

This invention relates to an additive for concrete and mortar comprising a cellulose ether and a non-ionic, low-foaming surface-active agent.

3 Claims, No Drawings

ADDITIVE FOR CONCRETE OR MORTAR AND THE USE THEREOF

This invention relates to an additive for concrete or mortar, which additive is composed of a cellulose ether and a surface active agent, and to the use of this additive as a pumping aid for concrete or cement motar.

The addition of cellulose ethers or surface active agents to concrete or mortar already has been known for a long time. For example, water-soluble cellulose ethers (for example methylhydroxyethyl celluloses) are employed for controlling the water retention, for improving the adhesion and for increasing the consistency of plaster, adhesive and filling compositions. Some of these areas of application are: high-adhesion one-coat plasters for hand application to extremely smooth or absorbent substrates, machine-thrown one-coat plasters for normal substrates, thin or finishing plasters, tile adhesives, thin-set mortars for gas concrete blocks and sand-line blocks, filler and jointing compounds, bricklayer's mortars, heat-insulating plasters, floating-and-set plasters, one-coat raked plasters or porous finishing plasters. Examples of areas of application of the surface active agents are: the non-ionic nonylphenol polyglycol ethers having about 4 to 15 moles of added ethylene oxide per mole of nonylphenol are used, in the case of a low proportion of ethylene oxide, as plasticizers which do not, or only slightly, entrain air, and, in the case of a high proportion of ethylene oxide, as air-entraining agents, so that it should also be possible, inter alia, to improve the pumpability of concrete or cement mortar; the anionic $C_{12}/C_{14}$ alcohol polyglycol ether-surfates are used as air-entraining agents which also exhibit a plasticizing action and improve the workability and the water retention of mortars; the anionic $\alpha$-olefin sulfonates are also good air-entraining agents which also have a wetting and plasticizing action.

Combined additives composed of cellulose ethers and certain surface active agents also already have been disclosed as described, in particular, in the following publications:

German Offenlegungsschrift No. 1,571,449, describes a hydraulic cement mortar which, in addition to Portland cement, a filler (for example sand), water and a polymer emulsion (for example a vinylidene/vinyl chloride/acrylic terpolymer), also contains methyl cellulose and anti-foam agents for reducing the formation of bubbles. In these mortars containing a polymer emulsion, the addition of cellulose ether is said to increase the binding strength of the mortars in the building units; about 0.03 to 0.1% by weight of cellulose ether is preferably employed in the mortar. These mortars contain silicon-based anti-foam agents in a proportion of about 0.1% by weight. These mortars are said to be suitable for joining building materials containing asphalt.

The hydraulic binder for the manufacture of plaster mortar and bricklayer's mortar, according to German Auslegeschrift No. 1,812,401, consists of at least 99.6% by weight of cement, 0.005 to 0.35% by weight of cellulose ethers and 0.005 to 0.2% by weight of surface active substances. The weight ratio of cellulose ethers to the surface active substances is chosen to be 3.5:1 to 1:1. By means of this additive, it is said to be possible to dispense with the admixture of stone dust when manufacturing this binder. Alkyl-, aryl- or alkylaryl-sulfonates, sulfite waste liquor and resin soaps are mentioned as surface active substances. The air space content in mortars manufactured with this binder is about 16.5 to 18.5%.

From German Offenlegungsschrift No. 2,046,046, a plaster mortar based on sand-lime, with the use of a hydraulic binder, is known which contains 0.03 to 1% by weight of agents for improving the adhesion (for example methylcellulose), 0.03 to 1% by weight of thixotropic agents, 0.02 to 0.3% by weight of dispersing powders and 0.02 to 0.3% by weight of air-entraining agents. The use of the last-mentioned agents leads to the introduction of about 10 to 40% of air.

German Offenlegungsschrift No. 2,060,106, describes a bonding composition for precast units of gas silicate concrete, which, in addition to binders, additives and mixing water, contains a cellulose ether as a water-retaining agent and a wetting agent. Ionic, non-ionic or amphoteric surface active agents, such as alkyl-sulfates, alkyl-, alkylaryl- or aryl-sulfonates, fatty acid condensation products, ethylene oxide adducts with fatty acids and alcohols, fatty alcohol sulfates, sulfated oils, alkyl polyglycol ethers, alkylphenol ethers or polyphosphates, are mentioned as wetting agents. In this case, the proportion of cellulose ether (carboxymethyl cellulose) is about 3.2% by weight and the proportion of wetting agent (alkylarylsulfonate) is about 0.8% by weight, based on the dry bonding composition.

The ultra-fine mortar for interior and exterior plaster, according to German Offenlegungsschrift No. 2,341,684, can, in addition to ground limestone, expanded perlite and a hydraulic binder, contain a cellulose ether, a polymer, a wetting agent, a hydrophobic agent or a set-controlling agent. The triethanolamine salt of a lauryl sulfate or of sodium lauryl-ether-sulfate is suitable as a wetting agent.

From German Offenlegungsschrift No. 2,450,681, an additive for self-smoothing mortar is known which consists of 30 to 80% by weight of a filling and carrier material having a specific surface area of more than 10 $m^2/g$, 10 to 40% by weight of an emulsifier system and 5 to 60% by weight of a water-retaining agent. The proportion of this additive is said to be about 2 to 8 parts by weight in 169 to 284 parts by weight of mortar. Silicates, oxides, carbonates and sulfates are suitable as filling and carrier materials. This filler has a carrier for the emulsifier system consisting of non-ionic surface-active agents, such as alkylphenols, fatty acids, fatty alcohols or ethylene oxide derivatives having 6 to 30 moles of ethylene oxide per mole of octylphenol or nonylphenol, and anionic surface active agents, such as sulfated derivatives of amides of aminoalcohols, amides derived from aminosulfonic acids or aminoacids, derivatives of monoesters or diesters and derivatives of alkylbenzene sulfonates. The filler combined with the emulsifier system is mixed with the water-retaining agent, for example a cellulose ether.

The additive for hydraulic mortar and concrete, according to German Offenlegungsschrift No. 2,527,546, accelerates the initial setting. In addition to a material which releases carbonate ions (for example $Na_2CO_3$) and an aluminate or an aluminum oxide, it contains a material which at least increases the thixotropy of the mortar or concrete, in particular a linear water-soluble polyethylene oxide. It is said that a concrete or mortar provided with this additive can be conveyed over long distances to the working site.

German Offenlegungsschrift No. 2,710,975 describes a pumpable cement-containing mixture of hydraulic cement, water, a porous light weight additive, a dispersing agent, a gelling agent, and, optionally, a plasticizer. The plasticizer, dispersing agent and gelling agent constituents are said to be in a weight ratio of 3:1:1, the proportion of dispersing and gelling agent in the finished mixture being 0.001 to 0.04% by weight. Water-soluble cellulose ethers are suitable as gelling agents, sulfonated products based on melamine/formaldehyde, polystyrene or naphthalene/formaldehyde are suitable as dispersing agents and lignosulfate and hydroxycarboxylic acid derivatives are suitable as plasticizers.

Recently, for example in the building of tower blocks, concretes or mortars have been increasingly conveyed through relatively long lengths of piping with the aid of pumps, so that they do not have to be made up on the working site from their constituents such as inorganic binders, additives and mixing water. The constituents, or also so-called ready-mixed concretes or ready-mixed mortars (that is to say the usual constituents including water-containing building materials), thus can be conveyed to places which are convenient for transport vehicles, from which they then can be transferred to the appropriate site via varying lengths of piping, which can also overcome height differences. To make up a plastic pumpable concrete or mortar of this kind, it is possible, for example, to choose a relatively large excess of mixing water; frequently, however, this leads to separation of part of the mixing water on the concrete or mortar surface ("bleeding"). Furthermore, sedimentation of coarse additives frequently takes place, while light-weight additives can cause demixing of the concrete or mortar constituents by "floating" on the surface. The pumping of the building materials can be considerably hindered by these phenomena because demixing and blockages can arise at bends, in very long pipelines and in particular during stoppages.

The known addition, see also above, of additives having a plasticizing action, for example anionic dispersing agents, such as alkylarylsulfonates, ethylene oxide addition products, alkylphenol polyglycol ethers, lignin sulfonates or, in particular, higher molecular weight anionic condensation products of optionally substituted aromatic hydrocarbons or aromatic heterocyclic compounds with aldehydes, is said to contribute to a distinct reduction in the mixing water requirement and also to an improvement in the flexibility of the concrete or mortar, in order thereby to achieve a better pumpability. However, various frequently disturbing disadvantages of the known plasticizers also have been disclosed. For example, the anionic dispersing agents which exhibit a relatively weak plasticizing action cause a certain decrease in the setting rate and an increase in the air space content. On the other hand, the higher molecular weight anionic condensation products which exhibit a relatively stronger plasticizing action give rise to sedimentation phenomena which also can lead to "bleeding".

In fact, the addition of high polymers, see also above, which can swell or dissolve in water (for example cellulose ethers, polyvinyl alcohols, polyacrylamides, polyethylene oxides or starch ethers), can prevent the "bleeding" and/or the demixing of the concrete or mortar, but it then frequently necessitates excessive amounts of mixing water because it normally results in a sticky consistency, in the concrete or mortar, which detracts from the pumpability thereof. Furthermore, an addition of this kind also leads to the stabilization of air bubbles which are already present or are introduced on mixing or pumping, or can exert an unduly strong delaying action on the setting time.

The object of the invention is therefore to provide an additive for concrete or cement mortar, which does not exhibit the disadvantages known from the state of the art and which, in particular, is suitable as a pumping aid for concrete or cement.

The invention is based on an additive, for concrete and mortar, composed of a cellulose ether and a surface active agent. In the additive according to the invention, the surface active agent is a non-ionic, low-foaming surface active agent.

The concretes and mortars include the most varied water-containing, setting building materials based on mixtures (before setting) of a binder, fillers and additives, water and optionally one or more indirect materials. Binders are usually cement, lime, gypsum, calcined magnesite or mixtures of two or more thereof; according to the invention, cement is preferably employed as the binder. As a rule, granular inorganic substances are used as the filler and additive, for example fine grain to coarse grain sand, silicates based on stone dust or blast furnace slags, limestone dust, kaolin, kieselguhr, perlite, pumice or foamed plastic beads (for example made of polystyrene). The indirect materials include inter alia, setting retarders or accelerators, thixotropic agents, antifreeze agents or agents which increase the water-impermeability; these indirect materials are advantageous for certain areas of application (for example light-weight concrete or thin layers of mortar) of the concretes or mortars. In the case of some areas of application, the use of fillers or additives is also dispensed with; this applies, in particular, to mortars based on gypsum or anhydrite.

The cellulose ethers which can be employed according to the invention are, in particular, water-soluble or predominantly water-soluble, non-ionic cellulose ethers, such as methyl cellulose (MC), alkylhydroxyalkyl cellulose and hydroxyalkyl cellulose, preferably methylhydroxyethyl cellulose (MHEC), methylhydroxypropyl cellulose (MHPC), ethylhydroxyethyl cellulose (EHEC) and hydroxyethyl cellulose (HEC). However, other mixed ethers also can be used, provided that they are water-soluble or predominantly water-soluble and have a non-ionic character which is at least predominant. The cellulose ethers can be employed as powders, fibrous material or as granules; in particular, they are present in a slow-swelling form, that is to say in a form which temporarily cannot swell, or can swell only slightly, in water, but they also can be employed if they have not been pretreated in respect of the swelling behavior, for example by means of superficial chemical cross-linking or another type of modification.

The cellulose ethers are appropriately used in amounts of about 0.005 to 0.5% by weight, in particular about 0.01 to 0.05% by weight, based on the weight of the dry solids in the mortar or concrete.

The non-ionic, low-foaming surface active agents used according to the invention are, in particular, those which have a larger proportion of hydrophobic groups than hydrophilic groups. These surface active agents preferably include pure block polymers of propylene oxide and ethylene oxide having a high proportion of propylene oxide and a low proportion of ethylene oxide, modified block polymers based on ethylene oxide and propylene oxide or products resulting from the reaction of alkylphenols (for example nonylphenol) with a small number of ethylene oxide molecules (alkyl-aryl poly-(ethylene glycol)ethers). Again, among these surface active agents, those having a proportion of propylene oxide are particularly preferred. Examples of the non-ionic, low-foaming surface active agents which can be used according to the invention are: block polymers of 90% of propylene oxide and 10% of ethylene oxide, block polymers of ethylenediamine, as the initiator molecule, and ethylene oxide and propylene oxide, block polymers of a $C_{12}/C_{14}$ alcohol and ethylene oxide and propylene oxide, and a nonylphenol polyglycol ether of nonylphenol and 4 moles of ethylene oxide.

The non-ionic, low-foaming surface active agents are appropriately used in amounts of about 0.5 to 20% by weight, in particular about 1 to 10% by weight, based on the weight of cellulose ether.

Provided that the non-ionic, low-foaming surface active agents are present only in liquid form, they are appropriately applied to inert carrier materials so that the pourability of the cellulose ethers to be mixed therewith is ensured as far as possible. Suitable carrier materials which can be used are silicates, oxides and certain carbonates or sulfates; for example, about 1 to 3 parts by weight of an aluminum silicate or of a silicic acid to 1 part by weight of surface active agent are sufficient as the carrier material.

The additive according to the invention can be added to particular concrete or mortar components or to the concrete or mortar after it already has been prepared; particularly appropriately, it can be used as a ready-made mixture of cellulose ether, surface active agent and optionally a carrier for the surface active agent, but also in the particular constituents composed of, on the one hand, the cellulose ether, and, on the other hand, the surface active agent.

In contrast to the additives known from the state of the art (see also the comparison examples described below), the additive according to the invention exhibits various advantages which render it suitable, in particular, for use as a pumping aid: for example, when adding this additive to mortar or concrete, the sedimentation tendency which is frequently to be observed on transferring these prepared building materials over relatively long distances or on storing them for a relatively long time, or the "bleeding", no longer takes place or takes place only to a very small extent. Moreover, the known properties of the cellulose ethers, such as control of the water retention, improvement of the adhesion and good cohesion of the concrete or mortar components to one another, are obtained without the occurrence of an unduly sticky consistency or a relatively large increase in the air space content, which frequently adversely affects the strength of the concrete or mortar.

The percent values given in the examples are always to be understood as percent by weight, unless otherwise stated. The measured values given in the examples were determined using the following building materials and in accordance with the following methods of measurement.

Building material 1

50 parts by weight of 350 F Portland cement
50 parts by weight of I standard sand
50 parts by weight of 0.2 to 0.7 mm silica sand
50 parts by weight of 1.0 to 2.2 mm silica sand
30 parts by weight of water Building material 2

50 parts by weight of 350 F Portland cement
100 parts by weight of 1.0 to 2.2 mm silica sand
50 parts by weight of H 33 silica sand
25 parts by weight of 0.2 to 0.8 mm silica sand
25 parts by weight of standard sand
31 parts by weight of water Building material 3

45 parts by weight of 350 F Portland cement
135 parts by weight of standard sand
22.5 parts by weight of water.

PUMPABILITY OF THE BUILDING MATERIAL

Two methods of measurement are employed for measuring the pumpability of the building material: the slump of the building material is determined, with and without additive, in cm on a vibrating table in accordance with DIN No. 1164 (1958 edition) and, in the case of building materials with additive, should be reduced only insignificantly compared with building materials without additive, so as not to have an unduly negative influence on its flow behavior.

The Powers values of the building material are used for determining the workability of the building material and are measured, with and without additive, in a small, design 7610, Powers vibrating device of the clay industry type. In this method, the building material is filled into a conical funnel, the latter is removed and the cone of building material is covered with a plate and measuring rod (freely movable up and down). The building material can escape laterally under a force such as is produced, in this case, by means of vibration shocks. The number of vibration shocks which are necessary in order to reach a certain level on the measuring rod (from 15 below to 2.5 above) is taken as a measure of the workability of the building material. A criterion for a good pumpability of the building material is that the increase in the vibration shocks should be as continuous as possible and the number of vibration shocks required should be as small as possible up to a Powers value of 4.

AIR SPACE CONTENT

The air space content is given in percent by volume and determined using the air space content tester (1 liter pressure vessel) of the clay industry type.

BENDING TENSION STRENGTH AND COMPRESSIVE STRENGTH

These values are determined in accordance with DIN No. 1164 (1970 edition, sheet 7) after a storage time of 28 days and are given in $kp/cm^2$.

SEDIMENTATION TENDENCY AND HOMOGENEITY

The sedimentation tendency was determined visually in accordance with comparative criteria in 3 categories, namely moderate, average and strong. The homogeneity was also determined in accordance with comparative criteria in 3 categories, namely good, average and poor.

COMPARISON EXAMPLES C 1 to C 5

A type 1 building material containing various mixtures, not according to the invention, or cellulose ethers (component 1) and surface-active agents or other known additives (component 2), and the corresponding building material without additive (C 1), are prepared and their air space content is determined. The results are summarized in Table I. In all examples, A MHEC having a viscosity (in 2% concentration aqueous solution at 20° C. according to Höppler of about 30 Pa·s (formerly 30,000 mP), with a methoxy content of about 28% by weight and a hydroxyethyl content of about 4 to 6% by weight, was employed as the cellulose ether; the amount of component 2 is based on the weight of cellulose ether.

EXAMPLES 1 TO 15

A type 1 building material containing various additives, according to the invention, composed of component 1 (MHEC of the same type as previously) and component 2 (a low-foaming, non-ionic surface-active agent), is prepared and the air space content is determined. The results are also summarized in Table I. When employing the additives according to the invention, a definite shift to a lower air space content can be seen, which can be recognized in particular when a proportion of propylene oxide is present in the surface-active agent molecule.

COMPARISON EXAMPLES C 6 to C 11

A type 2 building material (testing of the Powers values, the slump, the air space content, the sedimentation tendency and the homogeneity) or a type 3 building material (testing of the strength), containing additives (component 1), known from the state of the art, composed of polyethylene oxide (C 7 to C 10) and cellulose ether (C 11), and the corresponding building material without additive (C 6), are prepared and the tests are carried out. The results are summarized in Table II. A MHEC having a viscosity of about 30 Pa·s (of the same type as previously) was employed as the cellulose ether and the amount of component 1 is based on the weight of the dry solids content in the building material. It can be seen, inter alia, that an improvement in the workability of a building material to which polyethylene oxide has been added (to achieve a good pumpability) occurs only with an increasing amount of additive.

EXAMPLES 16 TO 22

A type 2 or type 3 building material (see above for types of test), with the additives according to the invention, shown in Table II, composed of component 1 (Examples 16 to 21, MHEC as in Examples 1 to 15, and Example 22, also a MHEC of the same degree of substitution but having a viscosity of about 10 Pa·s) and component 2 (a low-foaming, non-ionic surface-active agent), is prepared and the tests are carried out. The results are summarized in Table II. The amount of component 1 is based on the weight of the dry solids in the building matrial, and the amount of component 2 is based on the weight of cellulose ether. It can be seen, inter alia, that there is a definite drop in the air space content, compared with a pure cellulose ether additive, and an improvement in the workability with a reduced amount of additive, compared with a polyethylene oxide additive.

TABLE I

| Example | Added amount of cellulose ether, based on the dry solids in the building material | | Component 2 | | Air space content (% by volume) |
|---|---|---|---|---|---|
| | in parts by weight | in % by weight | Type | Amount in % by weight | |
| C 1 | — | — | — | — | 5.4 |
| C 2 | 0.2 | 0.1 | Na gluconate | 10 | 13.2 |
| C 3 | 0.2 | 0.1 | C$_{12}$/C$_{15}$ alcohol with 3 moles of ethylene oxide | 10 | 10.2 |
| C 4 | 0.2 | 0.1 | Mixture of mono-, di- and tri-oleyl orthophosphates | 10 | 12.8 |
| C 5 | 0.2 | 0.1 | Xylenol polyglycol ether | 5 | 12.2 |
| 1 | 0.2 | 0.1 | Nonylphenol polyglycol ether with 4 moles of ethylene oxide | 5 | 7.8 |
| 2 | 0.2 | 0.1 | Block polymer of polypropylene oxide, having a molecular weight of about 1,700, with 10% of ethylene oxide | 10 | 4.9 |
| 3 | 0.2 | 0.1 | Block polymer of polypropylene oxide, having a molecular weight of about 1,700, with 10% of ethylene oxide | 5 | 5.4 |
| 4 | 0.2 | 0.1 | Block polymer of polypropylene oxide, having a molecular weight of about 1,700, with 10% of ethylene oxide (+ 5% of silicic acid as carrier) | 5 | 4.7 |
| 5 | 0.2 | 0.1 | Block polymer of polypropylene oxide, having a molecular weight of about 1,700, with 10% of ethylene oxide (+ 7% of Al Silicate as carrier) | 3 | 5.4 |
| 6 | 0.2 | 0.1 | Block polymer of polypropylene oxide, having a MW of about 2,300, with 10% of ethylene oxide | 5 | 4.8 |
| 7 | 0.2 | 0.1 | Block polymer of polypropylene oxide, having a MW of about 2,300, with 10% of ethylene oxide (+ 5% of silicic acid as carrier) | 5 | 5.2 |
| 8 | 0.2 | 0.1 | Block polymer of polypropylene oxide, having a MW of about 2,300, with 10% of | 3 | 5.9 |

TABLE I-continued

| | Added amount of cellulose ether, based on the dry solids in the building material | | Component 2 | Amount | |
|---|---|---|---|---|---|
| Example | in parts by weight | in % by weight | Type | in % by weight | Air space content (% by volume) |
| | | | ethylene oxide (+ 7% of Al silicate as carrier) | | |
| 9 | 0.2 | 0.1 | $C_{12}/C_{14}$ alcohol with 4 moles of ethylene oxide + 4 moles of propylene oxide | 10 | 6.2 |
| 10 | 0.2 | 0.1 | $C_{12}/C_{14}$ alcohol with 4 moles of ethylene oxide + 4 moles of propylene oxide (+ 7% of Al silicate as carrier) | 3 | 6.7 |
| 11 | 0.2 | 0.1 | $C_{12}/C_{14}$ alcohol with 12 moles of ethylene oxide + 15 moles of propylene oxide | 10 | 4.7 |
| 12 | 0.2 | 0.1 | $C_{12}/C_{14}$ alcohol with 12 moles of ethylene oxide + 15 moles of propylene oxide (+ 7% of Al silicate as carrier) | 3 | 5.9 |
| 13 | 0.2 | 0.1 | Block polymer of ethylene diamine, ethylene oxide and propylene oxide | 5 | 5.5 |
| 14 | 0.2 | 0.1 | Block polymer of ethylene diamine, ethylene oxide and propylene oxide (+ 5% of silicic acid as carrier) | 5 | 5.3 |
| 15 | 0.2 | 0.1 | Block polymer of ethylene diamine, ethylene oxide and propylene oxide (+ 7% of Al silicate as carrier) | 3 | 6.6 |

TABLE II

| | Component 1 | | Component 2 | | | | |
|---|---|---|---|---|---|---|---|
| Example | Type | Amount in % by weight | Type | Amount in % by weight | Sedimentation tendency | Homogeneity | Slump (mm) |
| C 6 | — | — | — | — | average | average | 154 |
| C 7 | Linear polyethylene oxide having a MW of $>4 \cdot 10^6$ | 0.02 | — | — | average | averge | 165 |
| C 8 | Linear polyethylene oxide having a MW of $>4 \cdot 10^6$ | 0.05 | — | — | moderate | good | 159 |
| C 9 | Linear polyethylene oxide having a MW of about $10^4$ | 0.05 | — | — | strong | poor | 160 |
| C 10 | Linear polyethylene oxide having a MW of about $10^4$ | 0.10 | — | — | strong | poor | 157 |
| C 11 | MHEC | 0.02 | — | — | moderate | good | 167 |
| 16 | MHEC | 0.05 | Block polymer of polypropylene oxide, having a MW of about 1,700, with 10% of ethylene oxide (+ 7% of Al silicate as carrier) | 3 | moderate | good | 144 |
| 17 | MHEC | 0.02 | Block polymer of polypropylene oxide, having a MW of about 1,700, with 10% of ethylene oxide (+ 7% of Al silicate as carrier) | 3 | moderate | good | 164 |
| 18 | MHEC | 0.01 | Block polymer of polypropylene oxide, having a MW of about 1,700, with 10% of ethylene oxide (+ 7% of Al silicate as carrier) | 3 | average | average | 155 |
| 19 | MHEC | 0.02 | Block polymer of polypropylene oxide, | 5 | moderate | good | 157 |

TABLE II-continued

| Example | | | | |Number of vibration shocks up to a Powers value of| | | | | | |
|---------|------|------|------|------------------------------------------------------------------------------------------------|---|---|---|---|---|---|---|
| 20 | MHEC | 0.02 | having a MW of about 1,700, with 10% of ethylene oxide (+ 5% of silicic acid as carrier) Block polymer of ethylenediamine, ethylene oxide and propylene oxide (+ 7% of Al silicate as carrier) | 5 | moderate | good | 155 |
| 21 | MHEC | 0.02 | Block polymer of polypropylene oxide, having a MW of about 2,300, with 10% of ethylene oxide (+ 5% of silicic acid as carrier) | 3 | moderate | good | 150 |
| 22 | MHEC | 0.02 | Block polymer as in Example 16 | 3 | moderate | good | 153 |

| Example | Air space content in % by volume | Number of vibration shocks up to a Powers value of | | | | | | | Bending strength in kp/cm² after | | | Compressive strength in kp/cm² after | | |
|---------|------|----|---|---|----|----|----|----|------|------|------|-----|-----|-----|
| | | 10 | 9 | 8 | 7 | 6 | 5 | 4 | 2 days | 7 days | 28 days | 2 days | 7 days | 28 days |
| C 6 | 5.4 | 1 | 3 | 6 | 11 | 19 | 25 | 33 | 47.3 | 62.2 | 75.9 | 251 | 306 | 404 |
| C 7 | — | 1 | 3 | 6 | 12 | 18 | 25 | 34 | — | — | — | — | — | — |
| C 8 | 8.0 | — | 2 | 4 | 7 | 12 | 18 | 27 | 36.8 | 57.8 | 72.1 | 196 | 243 | 341 |
| C 9 | 8.2 | — | 2 | 4 | 7 | 12 | 19 | 27 | 36.3 | 50.9 | 70.5 | 193 | 247 | 351 |
| C 10 | — | 1 | 3 | 5 | 8 | 13 | 21 | 31 | — | — | — | — | — | — |
| C 11 | 11.1 | — | — | 2 | 5 | 8 | 13 | 19 | 40.2 | 49.1 | 60.0 | 169 | 204 | 278 |
| 16 | — | 1 | 4 | 8 | 13 | 21 | 31 | 51 | — | — | — | — | — | — |
| 17 | 7.8 | — | 3 | — | 6 | 10 | 16 | 25 | 46.3 | 58.2 | 69.3 | 214 | 255 | 332 |
| 18 | — | — | 3 | 6 | 9 | 14 | 22 | 29 | — | — | — | — | — | — |
| 19 | 7.1 | — | — | 5 | 9 | 15 | 22 | 29 | — | — | — | — | — | — |
| 20 | — | — | — | 5 | 8 | 13 | 19 | 36 | — | — | — | — | — | — |
| 21 | — | 1 | 3 | 5 | 9 | 14 | 22 | 32 | — | — | — | — | — | — |
| 22 | — | 1 | 3 | 5 | 9 | 13 | 20 | 29 | — | — | — | — | — | — |

It will be obvious to those skilled in the art that many modifications may be made within the scope of the present invention without departing from the spirit thereof, and the invention includes all such modifications.

What is claimed is:

1. An additive-mixture as a pumping aid for concrete and cement mortar consisting essentially of a water-soluble, non-ionic cellulose ether selected from the group consisting of methylhydroxyethyl cellulose, methylhydroxypropyl cellulose, ethylhydroxyethyl cellulose and hydroxyethyl cellulose, and a non-ionic, low-foaming surface-active agent selected from the group consisting of an optionally modified block polymer of propylene oxide and ethylene oxide, and an alkyl-aryl poly-(ethylene glycol)ether having a small proportion of ethylene oxide molecules, said surface-active agent being present in a proportion of about 0.5 to 20% by weight, based on the weight of said cellulose ether.

2. An additive-mixture according to claim 1 in which said non-ionic, low-foaming surface-active agent is selected from the group consisting of block polymers of 90% of propylene oxide and 10% of ethylene oxide, block polymers of ethylenediamine, as the initiator molecule, and ethylene oxide and propylene oxide, block polymers of a $C_{12}/C_{14}$-alcohol and ethylene and propylene oxide, and a nonylphenol polyglycol ether of nonylphenol and 4 moles of ethylene oxide.

3. Concrete or cement mortar including an additive-mixture according to claim 1 as a pumping aid, wherein said cellulose ether is present in a proportion of about 0.005 to 0.5% by weight, based on the weight of the dry solids in the mortar or concrete.

* * * * *